Oct. 7, 1958 H. T. LYMAN ET AL 2,855,516

WIDE RANGE TUNER FOR HIGH RADIO FREQUENCIES

Filed Nov. 1, 1955 3 Sheets-Sheet 1

INVENTORS
Harold T. Lyman
Francis G. Mason
BY Ooms, McDougall, Williams & Hersh
Attorneys Oct. 7, 1958 H. T. LYMAN ET AL 2,855,516

WIDE RANGE TUNER FOR HIGH RADIO FREQUENCIES

Filed Nov. 1, 1955 3 Sheets-Sheet 2

INVENTORS
Harold T. Lyman
Francis G. Mason
BY Dom, McDougall, Williams and Hersh
Attorneys Oct. 7, 1958 H. T. LYMAN ET AL 2,855,516

WIDE RANGE TUNER FOR HIGH RADIO FREQUENCIES

Filed Nov. 1, 1955 3 Sheets-Sheet 3

INVENTORS
Harold T. Lyman
Francis G. Mason
BY Dorris, McDougall, Williams & Hersh
Attorneys United States Patent Office 2,855,516

Patented Oct. 7, 1958

2,855,516

WIDE RANGE TUNER FOR HIGH RADIO FREQUENCIES

Harold T. Lyman, Milford, and Francis G. Mason, Weston, Conn., assignors to Aladdin Industries, Incorporated, Nashville, Tenn., a corporation of Illinois Application November 1, 1955, Serial No. 544,103

5 Claims. (Cl. 250—40)

Thus, one principal object of the present invention is to provide a new and improved tuner adapted to provide continuous coverage of an extremely wide range of frequencies, which may encompass, for example, both the very high frequency (V. H. F.) television band extending from 54 to 216 megacycles, and the ultra-high frequency (U. H. F.) television band extending from 470 to 890 megacycles.

A further object is to provide a new and improved tuner of the foregoing character which will cover its entire, extremely wide frequency range by less than a single revolution of a movable electrode or the like.

Another object is to provide a new and improved tuner which is extremely compact and economical in construction yet is highly effective and advantageous in operation.

It is a further object to provide a new and improved tuner of the foregoing character in which the major tuning components may be produced by printed circuit techniques.

Further objects and advantages of the invention will appear from the following description, taken with the accompanying drawings, in which.

Figure 1:
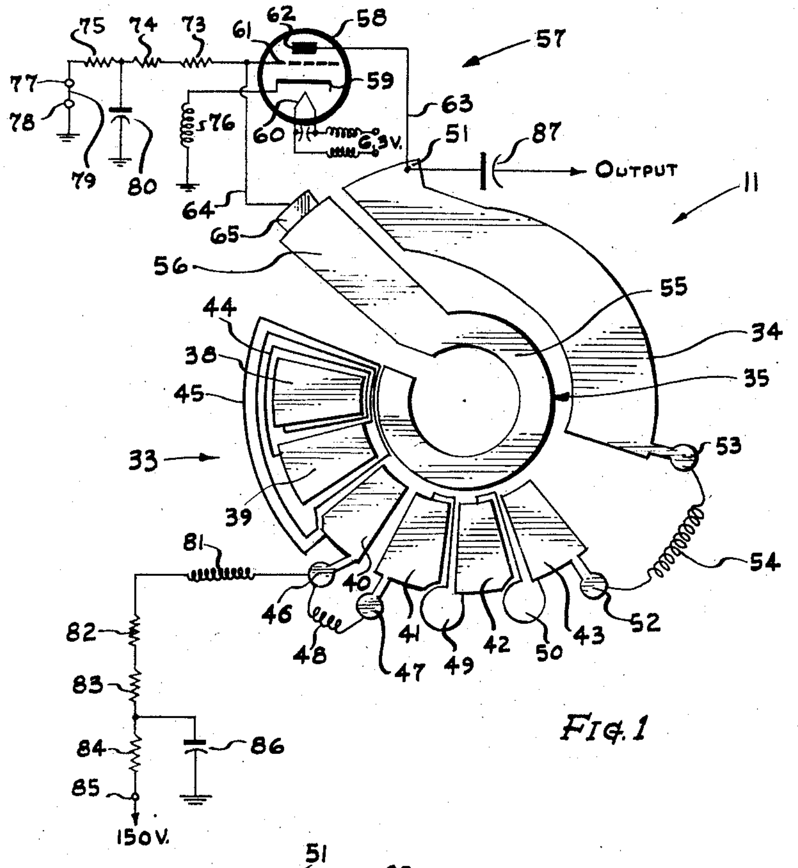
Figure 1 is a somewhat diagrammatic and partly schematic view illustrating a tuner which constitutes an illustrative embodiment of the invention, the view being partly a sectional view taken generally along a line 1—1 in Fig. 3.

If the drawings are considered in greater detail it will be seen that Figs. 1–7 illustrate a tuner 11 which will be described as a purely illustrative embodiment of the invention. The tuner 11 happens to be adapted to afford continuous coverage of both the V. H. F. and U. H. F. television bands, but it will be understood that the tuner might be arranged to cover any desired correspondingly wide band of frequencies in the high frequency spectrum.

As shown, the tuner 11 comprises a supporting member in the form of an insulating plate 12 having flat front and rear surfaces 13 and 14. An electrode 15 is movable in a predetermined path along the rear surface 14 of the plate 12. In this instance, the electrode 15 is swingably mounted and hence is movable along an arcuate path. However, it will be understood that the electrode might in some cases be mounted for movement along any other type of path, such as a linear path, for example. In the illustrated construction, the electrode 15 has outer and inner portions 16 and 17 which are movable along radially spaced outer and inner paths. The outer portion 16 is in the form of a generally sector-shaped arm made of sheet metal or the like and having upturned radial edges 18 to facilitate movement of the arm along the plate 12. It will be seen that the inner portion 17 is generally disk-shaped and is formed integrally with the arm 16.

The illustrated electrode 15 is carried on a rotatable control shaft 19 which extends through an aperture 20 in the plate 12. The shaft 19 is preferably of insulating material. To provide a driving connection between the shaft 19 and the electrode 15, a pair of flat sides 20 are formed on the shaft. While the electrode 15 might be connected to the shaft 19 in various ways, it will be seen that the electrode is mounted on a hub 21 which in turn is mounted on the shaft 19. A drive pin 22 is mounted on the disklike portion 17 of the electrode and extends parallel to the shaft through a key-way 23 formed in a flange 24 at the rear end of the hub 21. The hub 21 extends through an aperture 25 in the electrode 15 and is journalled in the aperture 20 formed in the plate 12.

A spring 26 is interposed between the electrode 15 and the flange 24 on the hub 21 so as to bias the electrode against the plate 12. Although the spring might assume various forms, it is shown with a plurality of spring fingers 27 which extend radially and forwardly from a disklike central member 28. It will be seen that the central member 28 abuts against the flange 24, while the fingers 27 push forwardly against the disklike portion 17 of the electrode 15. At one point around the central portion 28 of the spring 26, an elongated spring arm 29 extends outwardly and forwardly for engagement with the electrode arm 16 to urge the arm 16 against the plate 12.

It will be seen that the hub 21 is retained in the aperture 20 by means of a flat C-shaped clip 30 which is disengageably received in an annular groove 31 formed at the front end of the hub 21. A washer 32 may be interposed between the clip 30 and the front surface 13 of the plate 12.

Elements of a composite resonant circuit are mounted on the plate 12 and are adapted to be traversed by the electrode 15. Thus, a flat coil 33 and a flat line conductor 34 are mounted along successive portions of the path traversed by the outer electrode portion 15. A flat coupling electrode 35 extends along the arcuate path of the inner electrode portion 17. It will be seen that the element 35 is spaced and preferably insulated from the elements 33 and 34. In the resonant circuit afforded by the tuner, the elements 33 and 35 supply inductance, while the capacitance of the attached circuit elements and the inherent capacitances between the various elements of the tuner furnish the resonating capacitive reactance. Generally speaking, the electrode 15 acts as an adjustable bridge extending between the fixed electrode 35 and a selected point on either of the elements 33 and 34.

Figure 7:
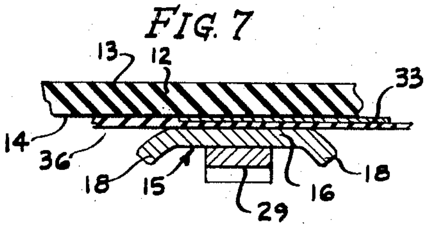
Fig. 7 is a fragmentary enlarged sectional view taken generally along a line 7—7 in Fig. 2.
Figure 8:
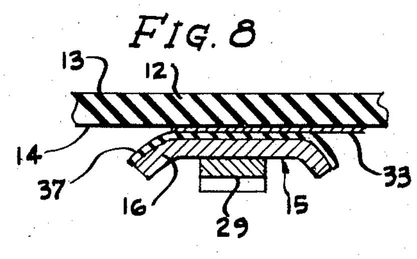
Fig. 8 is a view similar to Fig. 7 showing a slightly modified construction.

Although the coupling between the movable electrode 15 and the elements 33–35 might, in some cases, be conductive in nature, it is preferred that the coupling be capacitive. To this end, dielectric means are preferably interposed between the electrode 15 and the conductive elements 33–35. Figs. 7 and 8 illustrate two alternative arrangements of the dielectric means. In Fig. 7, the flat coil 33, and flat line conductor 34, and the flat electrode 35 are covered with a thin film 36 of suitable low loss insulating material, such as a synthetic lacquer-like coating, for example. The film 36 covers the flat surfaces of the elements 33–35 and is interposed between the elements and the movable electrode 15. In addition, the film 36 fills the spaces left unoccupied by the elements 33–35.

In the modified arrangement of Fig. 8, an insulating, filmlike member 37 is applied to the electrode 15 so as to be interposed between the electrode and the elements 33–35. The film 37 may be applied to the electrode 15 as a coating or may take the form of a sheet of low loss insulating material suitably secured to the electrode, by means of an adhesive or otherwise. The arrangement of Fig. 7 has the advantage of protecting the flat elements 33–35 against mechanical abrasion. On the other hand, the arrangement of Fig. 8 is highly economical.

Printed circuit techniques may be employed in forming the flat coil 33, the line conductor 34, and the fixed electrode 35 on the surface of the insulating plate 12. Thus, all three of these elements 33–35 preferably take the form of extremely thin layers of metal which are adherent to the rear surface 14 of the plate 12. Inasmuch as suitable printed circuit techniques are well known in the art, it will not be necessary to elaborate further in this regard.

Although the exact form of the flat coil 33 may be varied widely, it will be seen that the illustrated flat coil comprises a plurality of generally spiral-shaped coil elements which extend between a series of sector-shaped platelike electrodes. Six such electrodes or plates 38, 39, 40, 41, 42 and 43 are provided in the present case. A one turn coil element 44 extends around the first plate 38 and has its ends connected to the first and second plates 38 and 39. It will be seen that a coil element 45 or approximately two turns encircles the plates 38 and 39 and is connected between the plates 39 and 40. The portions of the coil 33 thus far described provide coverage of the six lowest channels, numbered 2–7, of the V. H. F. television band. The tuner is adjusted to these channels at six successive positions traversed by the outer electrode portion 16 in moving along the plates 38, 39 and 40.

In the illustrated coil 33, terminals 46 and 47 are brought out from the plates 40 and 41. A coil 48 is connected between these terminals 46 and 47. While the coil 48 might be formed as a flat element on the insulating plate 12, it is shown as a separate wire winding. The coil 48 provides additional inductance needed to tune the tuner to the five low frequency channels.

Fractional turn flat coil elements 49 and 50 extend along the surface of the insulating plate between the elements 41 and 42 and the elements 42 and 43. The seven high frequency channels, numbered 7–13, of the V. H. F. television band are covered at seven positions occupied by the outer electrode element 16 in passing along the plate elements 41–43.

While the flat line conductor 34 might assume various forms, it is shown as a generally arcuate member extending along the length of the path traversed by the outer electrode element 16. A generally radial end tab 51 is formed at the end of the flat conductor 34 remote from the end plate 43 of the flat coil 33. Terminals 52 and 53 are brought out from the adjacent ends of the flat coil 33 and the flat line conductor 34. An inductance element 54 is connected between the terminals 52 and 53. While the inductance element 54 might be formed as a flat coil element on the plate 12, it is shown as a separate wire winding. The inductance of the coil 54 is in the resonant circuit of the tuner throughout the V. H. F. television band.

While the flat coupling electrode 35 might assume various forms, it is shown with an arcuate portion 55 extending for nearly a complete circle along substantially the entire range of rotation of the electrode 15. The flat arcuate portion 55 underlies the disklike central portion 17 of the electrode 15 and is insulated therefrom by the dielectric means 36. A generally radial end tab 56 extends from one end of the arcuate portion 55, in generally parallel relation to the end tab 51 on the flat line conductor 34. Thus, the end tab 56 and the portion of the arcuate element 55 extending along the line conductor 34 constitute a second line conductor cooperating with the conductor 34 to define a two-conductor line. In traversing the line conductor 34, the movable electrode 15 acts as an adjustable bridge extending between the line conductor elements so as to vary the effective length of the line. Thus, the line conductor 34 and the corresponding conductor element of the electrode 35 are effective to cover the entire U. H. F. television band.

Figure 4:
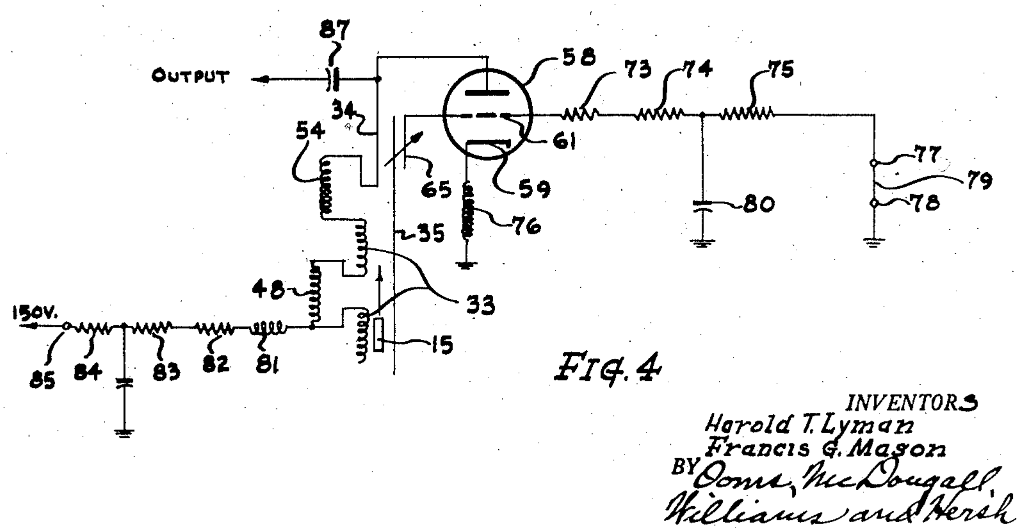
Fig. 4 is a representation of the tuner in the form of a schematic diagram.
Figure 5:
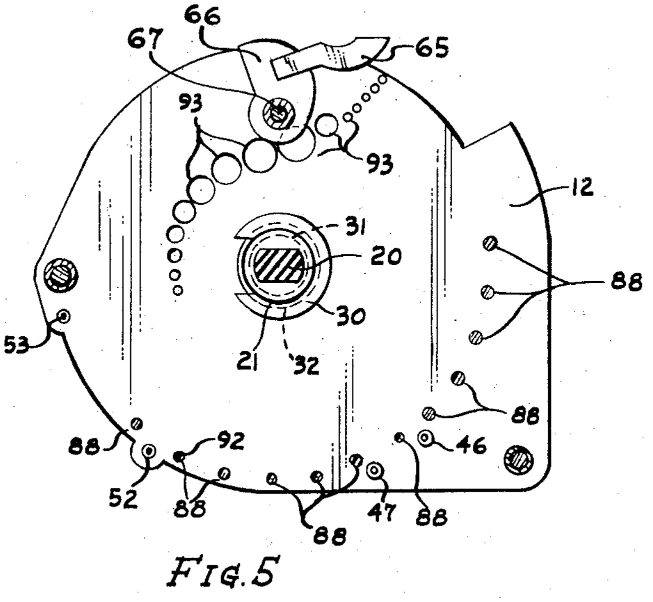
Fig. 5 is an elevational sectional view taken generally along a line 5—5 in Fig. 3.

While the tuner has numerous applications, it is shown in Figs. 1 and 4 in connection with an oscillator 57 which may be the high frequency heterodyning oscillator of a superheterodyne television receiver. The illustrated oscillator 57 comprises an amplifying element which is shown as an electron discharge device or vacuum tube 58 but might be a transistor or the like. A cathode 59, a cathode heater 60, a grid 61, and an anode 62 are provided in the tube 58. It will be seen that a lead 63 is connected between the anode 62 and the end tab 51 of the line conductor 34. A lead 64 extends between the grid 61 and a capacitor plate 65 which is in capacitive coupling relation with the end tab 56 on the flat electrode 35. To prove fine tuning, a spiral disk-shaped dielectric plate 66 is rotatably mounted for movement between the capacitor plate 65 and the end tab 56. A rotatable shaft 67 supports the dielectric tuning plate 66. The shaft 67 is mechanically coupled to a shaft 68 by means of a pair of frictionally engaged disk members 69 and 70. It will be seen that the shaft 68 is coaxially disposed around the main control shaft 20. Coaxial knobs 71 and 72 are mounted on the shafts 20 and 68 in the usual manner.

As the spiral plate 66 is rotated, the amount of dielectric material between the capacitor plate 65 and the tab 56 is varied. This changes the capacitance between the elements 56 and 65 and has sufficient effect upon the operating frequency of the oscillator 57 to accomplish fine tuning.

In the usual manner, grid resistors 73, 74 and 75 are connected between the grid 61 and ground. The cathode 59 is connected to ground through a radio-frequency choke coil 76 to complete the grid and anode circuits. It will be seen that metering terminals 77 and 78 are connected in series with the resistors 73–75. A jumper 79 or other short-circuiting element is normally connected across the terminals 77 and 78 but may be removed to permit metering of the grid current by a suitable metering instrument connected across the terminals. A bypass capacitor 80 is connected between ground and the junction of the resistors 74 and 75.

While the usual anode supply might be connected to the circuit at various points, it is shown connected to the terminal 46 on the flat coil 33. A radio-frequency choke coil 81 and three resistors 82, 83 and 84 are connected in series between the terminal 46 and a supply terminal 85 connected to the plate supply. The junction of the resistors 83 and 84 is bypassed to ground through a capacitor 86. It will be recognized that the direct current in the anode circuit flows through the coil 48, the elements 41, 49, 42, 50 and 43 of the flat coil 33, the coil 54, and the line conductor 34 to the anode lead 63.

The output of the oscillator 57 might be taken from various points in the circuit, but, as shown, it is taken from the terminal 51 through a coupling capacitor 87.

Figures 6, 9:
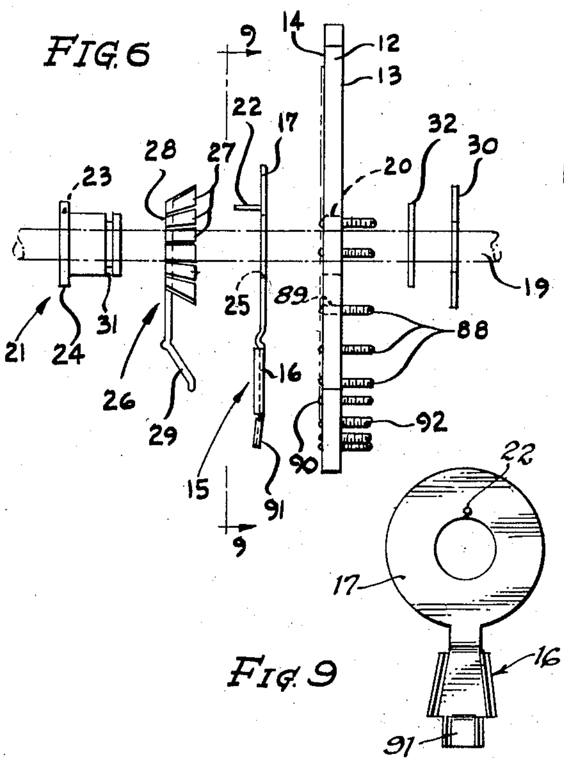
Fig. 6 is an exploded side elevational view of the tuner.
Fig. 9 is an elevational view of a movable tuning element, the view being taken generally along a line 9—9 in Fig. 6.

In the illustrated tuner, an individual trimming adjustment is provided for each channel in the V. H. F. television band. While the trimming adjustments might be made in various ways, they are provided in the present case by a series of twelve adjusting screws 88, which are threaded into apertures 89 formed in the insulated plate 12. The screws 88 are preferably of insulating material and are arranged to act as adjustable stops for effecting slight variations in the position of the electrode 15 relative to the flat coil 33. Thus, the insulating screws 88 may be adjusted so as to project slightly in a rearward direction from the plate 12, as shown in Fig. 6. Each screw 88 has a rounded rear end portion or nose 90 adapted to engage a tab 91 extending outwardly from the outer electrode portion 16. As the electrode 15 is swung along the flat coil 33, the tab 91 rides up on any of the screws 88 that project into its path. The resulting rearward movement of the outer electrode portion 16 reduces the capacitance between the electrode portion and the underlying portion of the flat coil 33 and thereby affects the resonant frequency of the tuner. The screws 88 are disposed at the positions occupied by the outer electrode portion 16 in covering the twelve V. H. F. television channels. Thus, the resonant frequency of the tuner may be adjusted for each of the twelve channels. A screw driver slot 92 or some other tool-engaging element may be provided at the front end of each screw 88 to facilitate adjustment of the screw.

In the illustrated tuner 11, several holes 93 are formed in the insulating plate 12 between the line conductor 34 and the parallel portion of the flat electrode 35. The formation of these holes reduces the amount of dielectric material between the two conductors of the line and thereby reduce the losses in the tuner.

Figure 2:
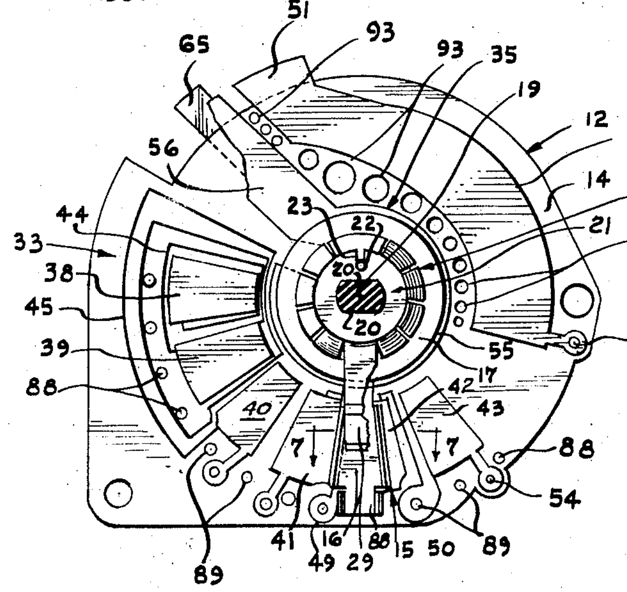
Fig. 2 is an elevational view of the tuner, partly in section, along a line 2—2 in Fig. 3.
Figure 3:
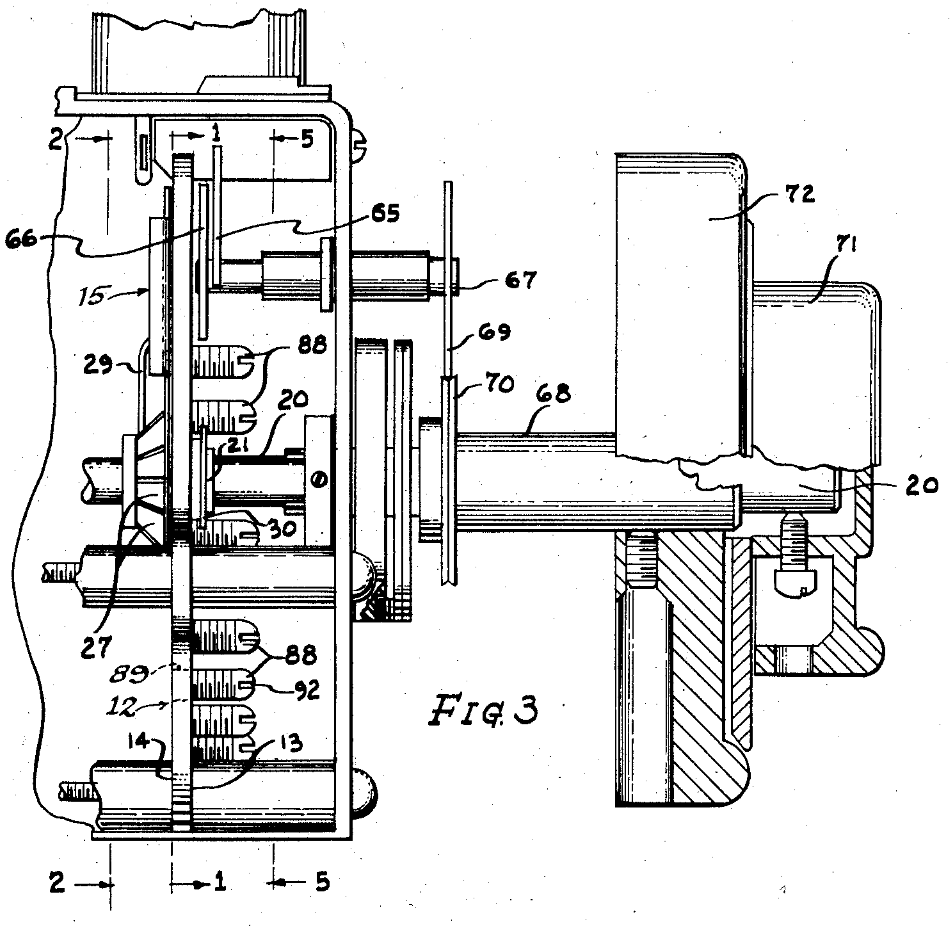
Fig. 3 is a side elevational view of the tuner, with certain components partly broken away.

In operation, the tuner 11 is aljusted by rotating the main tuning shaft 20 so as to swing the arm portion 16 of the electrode 15 along the flat coil 33 and the flat line conductor 34. While moving along the flat coil 33, the electrode arm 16 provides an adjustable tap coupled capacitatively to the underlying portion of the flat coil. The coupling is capacitive because of the dielectric coating 36 interposed between the electrode and the flat coil. In the modification of Fig. 8, the dielectric film 37 on the electrode 15 insulates the electrode from the flat coil. The electrode 15 effectively couples the portion of the flat coil underlying the electrode arm 16 to the flat stationary electrode 35 and thence to the terminal tab 56. Thus, movement of the electrode 16 varies the amount of inductance between the terminal tabs 51 and 56. The inductances of the line conductor 34 and the coil 54 are in the circuit throughout the V. H. F. band. Various portions of the flat coil 33 are in the circuit according to the position of the electrode arm 16. For the five lower channels of the V. H. F. band, the inductance of the coil 48 is in the circuit, in addition to that of the coil 54. The general position of the electrode 16 for the twelve V. H. F. channels is indicated by the positions of the adjusting screws 88 as shown in Fig. 2. Each screw 88 may be adjusted so as to project rearwardly from the insulating plate 12. Each projecting screw will engage the tab 91 and thereby effect rearward movement of the electrode arm 16, away from the underlying portion of the flat coil 33. Thus, adjustment of the screw will vary the capacitance between the electrode arm 16 and the flat coil 33 and thereby will affect the resonant frequency of the tuner.

To cover the U. H. F. television band, the electrode arm 16 is moved along the flat line conductor 34. In effect, the electrode 15 forms an adjustable bridge between the line conductor 34 and the corresponding portion of the stationary electrode 35. Thus, the electrode 15 is effective to vary the length of the line. In this way, the resonant frequency of the tuner is varied throughout the entire U. H. F. band.

Manual fine tuning may be accomplished by rotating the fine tuning knob 72 on the outer shaft 68. Through the medium of frictionally engaged disk members 69 and 70, the shaft 67 and the spiral dielectric plate 66 will be rotated. Changing the position of the spiral dielectric plate 66 will vary the amount of dielectric material between the terminal tab 56 and the capacitor plate 65 and thereby will affect the resonant frequency of the tuner. The effect is slight but is sufficient to provide fine tuning.

It will be recognized that the tuner is extremely simple and compact in construction. The flat coil and the flat line elements may be formed with great accuracy yet at low cost by printed circuit techniques. Thus, the tuner is unusually economical in construction. Nevertheless, continuous coverage is provided over extremely wide frequency ranges.

Various modifications, alternative constructions and equivalents may be employed without departing from the true spirit and scope of the invention as exemplified in the foregoing description and defined in the following claims:

We claim:

1. In a high frequency tuner, the combination comprising an insulating plate having a flat supporting surface, a flat coil secured on said flat supporting surface of said plate and extending along a first arcuate path, said coil having a plurality of flat generally spiral coil elements connected in series and distributed along said first path, a fixed coupling electrode mounted on said surface and extending along a second arcuate path generally parallel to said first path and spaced radially inwardly therefrom, a movable electrode swingably mounted and resiliently biased against said supporting surface of said plate and having outer and inner portions movable along said flat coil and said coupling electrode, dielectric means insulating said movable electrode from said flat coil and said fixed electrode, said movable electrode thereby providing a capacitively coupled variable tap on said flat coil, and a plurality of adjustable trimming elements distributed in spaced relation on said plate along said flat coil and in the path of said outer portion of said movable electrode, each of said trimming elements being movable into and out of a range of positions with said element projecting outwardly from said supporting surface for camming said outer portion of said movable electrode away from said supporting surface to a slight adjustable extent so as to vary the capacitance between said movable electrode and the underlying portion of said flat coil adjacent said element.

2. In a high frequency tuner, the combination comprising an insulating plate having a flat supporting surface, a flat coil secured on said flat supporting surface of said plate and extending along a first arcuate path, said coil having a plurality of flat generally spiral coil elements connected in series and distributed along said first path, a fixed coupling electrode mounted on said surface and extending along a second arcuate path generally parallel to said first path and spaced radially inwardly therefrom, a movable electrode swingably mounted and resiliently biased against said supporting surface of said plate and having outer and inner portions movable along said flat coil and said coupling electrode, dielectric means insulating said movable electrode from said flat coil and said fixed electrode, said movable electrode thereby providing a capacitively coupled variable tap on said flat coil, and a plurality of trimming screws made of insulating material and received in internally threaded openings in said plate distributed in spaced relation along said flat coil in the path of said outer portion ot said movable electrode, each of said screws being movable outwardly of said flat supporting surface on said plate to an adjustable extent for camming said outer portion of said movable electrode away from said supporting surface and thereby varying the capacitance between said movable electrode and the underlying portion of said flat coil.

3. In a high frequency tuner, the combination comprising an insulating plate having a flat supporting surface, a plurality of flat electrodes mounted on said supporting surface in an arcuate path, a flat coil comprising a plurality of flat coil elements mounted on said supporting surface and connected between said flat electrodes to form an inter-connected series, a swingable electrode resiliently biased against said supporting surface and having an outer portion movable along said arcuate path and over said flat electrodes, dielectric means insulating said swingable electrode from said flat electrodes, and a plurality of trimming screw elements distributed in spaced-apart relation along said arcuate path and received in threaded openings in said plate for adjustable movement into outwardly projecting relation to said flat supporting surface for camming said outer portion of said swingable electrode away from said supporting surface to a slight adjustable extent and thereby varying the capacitance between said swingable electrode and the underlying flat electrodes, said screw elements being substantially greater in number and spaced at smaller intervals than said flat electrodes so as to provide a greater number of positions of adjustment of said swingable electrode than the number of said flat electrodes.

4. In a high frequency tuner, the combination comprising an insulating plate having a flat supporting surface, a plurality of flat electrodes mounted on said supporting surface in an arcuate path, a flat coil comprising a plurality of flat coil elements mounted on said supporting surface and connected between said flat electrodes to form an inter-connected series, a swingable electrode resiliently biased against said supporting surface and having an outer portion movable along said arcuate path and over said flat electrodes, dielectric means insulating said swingable electrode from said flat electrodes, and a plurality of trimming screw elements distributed in spaced-apart relation along said arcuate path and received in threaded openings in said plate for adjustable movement into outwardly projecting relation to said flat supporting surface for camming said outer portion of said swingable electrode away from said supporting surface to a slight adjustable extent and thereby varying the capacitance between said swingable electrode and the underlying flat electrodes.

5. In a high frequency tuner, the combination comprising an insulating plate having a flat supporting surface, a plurality of flat electrodes mounted on said supporting surface in an arcuate path, a flat coil comprising a plurality of flat coil elements mounted on said supporting surface and connected between said flat electrodes to form an inter-connected series, a swingable electrode resiliently biased against said supporting surface and having an outer portion movable along said arcuate path and over said flat electrodes, dielectric means insulating said swingable electrode from said flat electrodes, and a plurality of trimming elements distributed in spaced-apart relation along said arcuate path for adjustable movement into outwardly projecting relation to said flat supporting surface for camming said outer portion of said swingable electrode away from said supporting surface to a slight adjustable extent and thereby varying the capacitance between said swingable electrode and the underlying flat electrodes.

References Cited in the file of this patent

UNITED STATES PATENTS

| | | |
|---|---|---|
| 2,244,023 | Sauer | June 3, 1941 |
| 2,246,928 | Schick | June 24, 1941 |
| 2,453,489 | Bruntil | Nov. 9, 1948 |
| 2,510,842 | Strutt | June 6, 1950 |
| 2,513,392 | Aust | July 4, 1950 |
| 2,678,435 | Vaughan | May 11, 1954 |
| 2,682,643 | Thias | June 29, 1954 |
| 2,717,362 | Press | Sept. 6, 1955 |

FOREIGN PATENTS

| | | |
|---|---|---|
| 291,037 | Italy | Dec. 5, 1931 |

UNITED STATES PATENT OFFICE

CERTIFICATE OF CORRECTION

Patent No. 2,855,516 October 7, 1958

Harold T. Lyman et al.

It is hereby certified that error appears in the printed specification of the above numbered patent requiring correction and that the said Letters Patent should read as corrected below.

Column 1, preceding line 15, insert the first paragraph of the specification as follows:

> This invention relates to radio frequency tuners adapted to cover a wide frequency range, such as one encompassing the bands now assigned for commercial television service, for example.

column 4, line 23, for the word "prove" read -- provide --.

Signed and sealed this 23rd day of December 1958.

(SEAL)

Attest:

KARL H. AXLINE
Attesting Officer

ROBERT C. WATSON
Commissioner of Patents